(12) United States Patent
Zhang et al.

(10) Patent No.: US 9,772,455 B2
(45) Date of Patent: Sep. 26, 2017

(54) UNIVERSAL OPTICAL FIBER CONNECTOR

(71) Applicant: INNO INSTRUMENT (CHINA) INC., Weihai (CN)

(72) Inventors: Yuzhong Zhang, Weihai (CN); Xun Jin, Weihai (CN)

(73) Assignee: INNO INSTRUMENT (CHINA) INC., Weihai (CN)

( * ) Notice: Subject to any disclaimer, the term of this patent is extended or adjusted under 35 U.S.C. 154(b) by 0 days.

(21) Appl. No.: 14/923,537

(22) Filed: Oct. 27, 2015

(65) Prior Publication Data
US 2016/0116684 A1  Apr. 28, 2016

(30) Foreign Application Priority Data
Oct. 27, 2014 (CN) .......................... 2014 1 0579854

(51) Int. Cl.
*G02B 6/38* (2006.01)
*G02B 6/44* (2006.01)

(52) U.S. Cl.
CPC ......... *G02B 6/3861* (2013.01); *G02B 6/3846* (2013.01); *G02B 6/3871* (2013.01); *G02B 6/3887* (2013.01); *G02B 6/4476* (2013.01)

(58) Field of Classification Search
CPC ........... G02B 6/38; G02B 6/3861; G02B 6/44
USPC .......................................................... 485/78
See application file for complete search history.

(56) References Cited

U.S. PATENT DOCUMENTS

| | | | | |
|---|---|---|---|---|
| 5,684,911 A | * | 11/1997 | Burgett | 385/135 |
| 6,152,609 A | * | 11/2000 | Dzyck et al. | 385/86 |
| 6,337,737 B1 | * | 1/2002 | Chang et al. | 356/32 |
| 2005/0117857 A1 | * | 6/2005 | Cooke et al. | 385/100 |
| 2009/0162019 A1 | * | 6/2009 | Lichoulas et al. | 385/99 |

* cited by examiner

*Primary Examiner* — Kaveh C Kianni
(74) *Attorney, Agent, or Firm* — Anova Law Group, PLLC

(57) ABSTRACT

The present invention relates to a universal optical fiber connector including a hot-melt end connector assembly, a heat-shrinkable sleeve and a protective shell for the heat-shrinkable sleeve. The assembly further comprises the main body of the hot-melt end, and a ceramic ferrule, a wedge for the ceramic ferrule and a pre-embedded optical fiber passing through the main body. The tail end of the protective shell for the heat-shrinkable sleeve is connected with an optical fiber locking device for the locking of the optical fiber; the locking device and the protective shell for the heat-shrinkable sleeve are separately configured. The present invention is applicable to optical fibers of different sizes and can improve the tensile properties of the optical fiber connector, and the protective shell for the heat-shrinkable sleeve can be volume-produced with the same mould instead of being produced independently for each type, so as to improve the production efficiency.

9 Claims, 7 Drawing Sheets

UNIVERSAL OPTICAL FIBER CONNECTOR

CROSS-REFERENCE TO RELATED APPLICATIONS

This application claims the priority of Chinese Patent Application No. 201410579854.X, entitled "Universal Optical Fiber Connector", filed on Oct. 27, 2014, the entire contents of which are incorporated herein by reference.

TECHNICAL FIELD

The present invention relates to the technical field of optical fiber connection and, more particularly, to a universal optical fiber connector for hot-melt splicing.

BACKGROUND

The technology of Fiber To The Home (FTTH), which connects optical cables into ordinary families and can be applied to apartments, residences, etc., provides various information including broadcasting and communications. The FTTH system is connected into homes with its ends configured in the form of optical fiber connectors. FTTH workers now consider the connection between optical cables and set the length of the cables several meters longer than the measured length, after which the optical cables are introduced into homes. They also cut the optical cables according to the desired length at the homes that they are working, after which the optical cables are mounted with optical fiber connectors at their ends, and then they are connected to the optical adapter and configured in homes.

The optical fiber connector comprises a ceramic ferrule and a tail handle of the ferrule. The front end of the tail handle is connected with the back end of the ceramic ferrule, and a short optical fiber (also called pre-embedded optical fiber) are fixed in the center hole of the ceramic ferrule, with all these constituting the hot-melt end connector. The short optical fiber is welded with the fiber core of the optical cables to be spliced. The welding part is configured with a heat-shrinkable sleeve; screw threads are configured at the back end of the tail handle of the ferrule; the heat-shrinkable sleeve is configured on the outer side of the welding part with one end of the heat-shrinkable sleeve covering the screw threads and the other end covering the surface of the on-site optical cable, after which the heat-shrinkable sleeve is enveloped by the protective sleeve for protection. The conventional optical fiber connectors have the following defects:

1. For the tensile optical fiber connector, the to-be-spliced optical fibers are usually fixed by tightening of the screw threads. When clamping quadrate optical fibers (such as rubber-covered cables), the to-be-spliced optical fibers may rotate as the tightening of the nut for the snap of the optical fiber is often unable to clamp the two opposite sides of the optical fiber in a bonded way, which results in the occurrence of the damaged splicing quality of the splicing point and even the malfunction of the connector;

2. Since to-be-spliced optical fibers are of different sizes, the conventional optical fiber connectors have to be produced by various types to apply to optical fibers of certain specifications; or the tensile resistance falls far short of what is required even they are applicable to multiple types of optical fibers.

3. Optical fiber connectors are of a variety of types, each of which has its corresponding protective sleeve according to the structure and the size of its hot-melt end, thus the protective sleeve is not compatible. A protective sleeve of a certain type for the optical fiber connector can only be replaced by one of the same type or discarded if damaged, thus causing a waste of materials.

SUMMARY

The objective of the present invention is to provide a universal optical fiber connector, allowing optical fibers of different types to adopt the same optical fiber connectors with a satisfactory tensile resistance.

To realize the above-mentioned objective, the present invention provides a universal optical fiber connector, which comprises a hot-melt end connector assembly, a heat-shrinkable sleeve and a protective shell for the heat-shrinkable sleeve, among which, the hot-melt end connector assembly further comprises the main body, and a ceramic ferrule, a wedge for the ceramic ferrule and a pre-embedded optical fiber passing through the main body. The tail end of the protective shell for the heat-shrinkable sleeve is connected with an optical fiber locking device for the locking of the optical fiber; the locking device and the protective shell for the heat-shrinkable sleeve are both independently configured.

The optical fiber connector according to the preferred embodiments of the present invention, wherein the optical fiber locking device further comprises a dismountable optical fiber snap and an optical fiber locking nut, and the optical fiber locking nut is connected with the screw threads at the back end of the protective shell for the heat-shrinkable sleeve.

The optical fiber connector according to the preferred embodiments of the present invention, wherein the protective shell for the heat-shrinkable sleeve can be dismountably connected with the optical fiber snap which has two elastic laminates with a gap between them. The optical fiber snap couples the optical fiber locking nut externally after being connected with the protective shell for the heat-shrinkable sleeve.

The optical fiber connector according to the preferred embodiments of the present invention, wherein the tail end of the protective shell for the heat-shrinkable sleeve and that of the optical fiber snap are respectively configured with a dentate part that could be in mesh (e.g., the dentate parts can engage one another), allowing only unidirectional movements of the optical fiber snap relative to the protective shell for the heat-shrinkable sleeve, thus, the optical fiber snap doesn't rotate with the tightening of the optical fiber locking nut after being connected with the protective shell for the heat-shrinkable sleeve.

The optical fiber connector according to the preferred embodiments of the present invention, wherein teeth are configured on the inner side of the two elastic laminates of the optical fiber snap.

The optical fiber connector according to the preferred embodiments of the present invention, wherein the heat-shrinkable sleeve envelopes the back segment of the pre-embedded optical fiber; the protective shell for the heat-shrinkable sleeve covers the heat-shrinkable sleeve; and the main body is dismountably connected with one end of the protective shell for the heat-shrinkable through screw threads.

The optical fiber connector according to the preferred embodiments of the present invention, wherein the protective shell for the heat-shrinkable sleeve is tubular and configured with screw threads at the front end of its inner edge.

The optical fiber connector according to the preferred embodiments of the present invention, wherein the main body further comprises a tubular nut at the front end of the wedge, a nut at the back end of the wedge and a retaining nut. The edge on the inner side of the tail end of the nut at the front end of the wedge is connected to the screw threads on the edge of the outer side of the front end of the nut at the back end of the wedge, clamping the wedge for ceramic ferrule.

The outer edge at the tail end of the nut at the back end of the wedge is connected with the screw threads of the protective shell for the heat-shrinkable sleeve, and there is a prominence on the inner edge of the retaining nut. The nut at the front end of the wedge is configured with a raised first step in the middle of the outer edge; the nut at the back end of the wedge, a raised second step on the outer edge; and the prominence on the inner edge of the retaining nut slides back and forth in a limited area between the first step and the second step.

The optical fiber connector according to the preferred embodiments of the present invention, wherein the main body further comprises a front shell of the wedge and a back shell of the wedge. The front shell and back shell are clamped into a whole, clamping the wedge for the ceramic ferrule; the back shell of the wedge is configured with screw threads on the outer edge of the tail end, which is for coupling with the screw threads of the protective shell for the heat-shrinkable sleeve.

The optical fiber connector according to the preferred embodiments of the present invention, wherein the main body of the retaining further comprises a retaining nut for the connector and a retaining nut for the wedge. The wedge for the ceramic ferrule is fixed by the retaining nut for the wedge after passing through the middle of the retaining nut for the connector. The retaining nut for the wedge is hollow, the pre-embedded optical fiber passes through the middle of the retaining nut for the wedge, and the retaining nut of the wedge is configured with screw threads on the outer edge of the back end, which is for coupling with the screw threads of the protective shell for the heat-shrinkable sleeve.

On the one hand, the universal optical fiber connector provided by the present invention is configured with a locking device for the optical fiber snap, which is independent from the protective shell for the heat-shrinkable sleeve, thus different optical fiber snaps can be used and chosen cooperatively in accordance with different optical fibers; in regards to some special optical fibers, the snap may not be adopted and the protection can be realized by tightening the locking nut and the protective shell for the heat-shrinkable sleeve, consequently allowing the connector to be compatible to a variety of optical fibers. Moreover, the optical fiber snap can only move unidirectionally towards the protective shell for the heat-shrinkable sleeve and doesn't rotate as the nut does, thus the optical fiber may not twist during locking and affect the splicing quality at the splicing point.

On the other hand, the main body is configured with universal screw threads according to the size of the protective shell for the heat-shrinkable sleeve and the screw threads configured on the protective shell for the heat-shrinkable sleeve, realizing the dismountable connection between the main body and one end of the protective shell for the heat-shrinkable sleeve through screw threads, and strengthening the tensile strength of the optical fiber connector, thus the protective shell for the heat-shrinkable sleeve of optical fiber connectors of different types can be replaced by those optical fiber connectors of other types when they are damaged, so as to improve the resource utilization efficiency and avoid wasting. Moreover, the protective shell for the heat-shrinkable sleeve can be volume-produced with the same mould instead of being produced independently for each type, thus improving the production efficiency.

DESCRIPTION OF DRAWINGS

The following is a brief description of the drawings needed in the description of the embodiments or the prior art to illustrate the technical solutions in the embodiments of the present invention more clearly. Apparently, the drawings in the following description are just some embodiments of the present invention. The ordinary skilled person in the art can obtain other drawings based on these without creative efforts.

DETAILED DESCRIPTION OF EMBODIMENTS

Figure 1A:
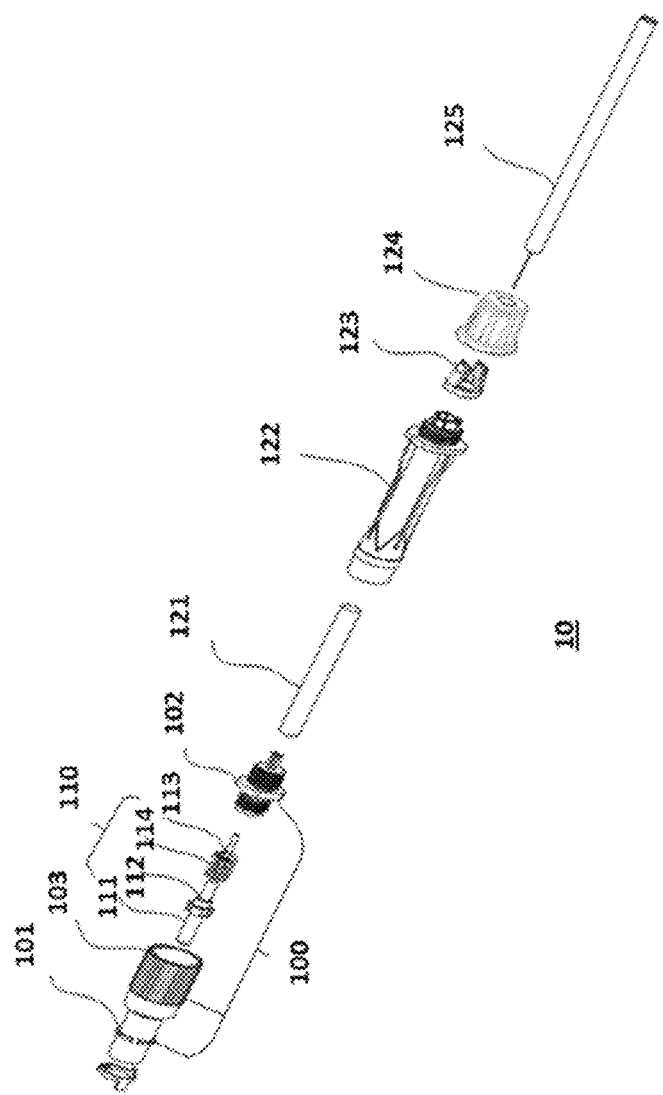
FIG. 1A is an exploded view of the first embodiment of the universal optical fiber connector provided by the present invention.

The following is a further detailed description of the universal optical fiber connector provided by the embodiments of the present invention with reference to the accompanying drawings. However, the embodiments in the present invention and the assemblies shown in the drawings are the preferred embodiments of the present invention, which cannot substitute for the idea of art of the present invention. The terms and words used in the manual and claims are for the illustration of the technical solutions of the present invention in the best way, which should not be understood as limits for the idea of art of the present invention.

The present disclosure is to provide a universal optical connector, which comprises a hot-melt end connector assembly, a heat-shrinkable sleeve and a protective shell for the heat-shrinkable sleeve, among which, the assembly further comprises the main body, and a ceramic ferrule, a wedge for the ceramic ferrule and a pre-embedded optical fiber passing through the main body. The heat-shrinkable sleeve envelopes the back segment of the pre-embedded optical fiber and the protective shell for the heat-shrinkable sleeve covers the heat-shrinkable sleeve.

At the tail end of the protective shell for the heat-shrinkable sleeve, an optical fiber locking device for the split-connection with the protective shell for the heat-shrinkable sleeve is configured. The optical fiber locking device can rotate relatively with the protective shell, ensuring that the corresponding side of the rectangle-sectioned optical fiber, such as sheathed optical cables, with the snap of the locking device is the long side, which avoids the distortion of the heat-shrunk optical fiber caused by the non-correspondence of the snap and the long side of the optical fiber and thus affects its loss. In this way, the invention is applicable to optical fibers of different sizes.

Besides, in the preferred embodiments, the main body can be dismountably connected with one end of the protective shell for the heat-shrinkable sleeve through screw threads. The protective shell for the heat-shrinkable sleeve is universalized by the configuration of the universal screw threads, which match with the size of the protective shell for the heat-shrinkable, at the connection location of the main body of optical fiber connectors of different types. Conventionally, the applicable protective shell for the heat-shrinkable sleeve is tubular, with screw threads configured on the inner edge of the front end.

The optical fiber connector according to the preferred embodiments of the present invention, wherein the protective shell for the heat-shrinkable sleeve is tubular, with screw threads configured on the inner edge of the front end.

Figure 1B:
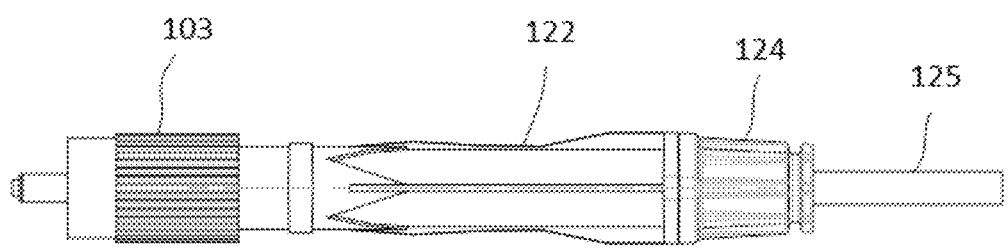
FIG. 1B is a constitutional diagram of the first embodiment of the universal optical fiber connector provided by the present invention.
Figure 1C:
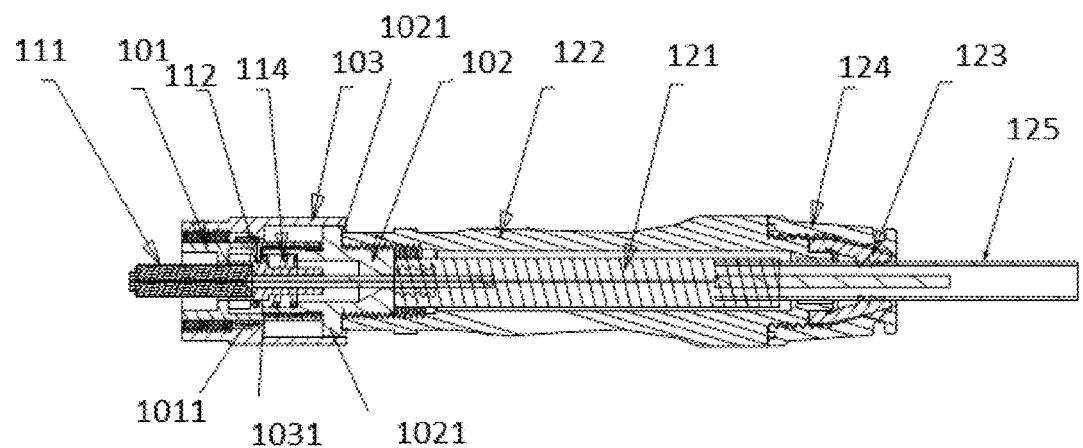
FIG. 1C is a sectional view of the first embodiment of the universal optical fiber connector provided by the present invention.

FIG. 1A is an exploded view of the first embodiment of the universal optical fiber connector 10 provided by the present invention; FIG. 1B is a constitutional diagram of the embodiment; and FIG. 1C is a sectional view of the embodiment. It can be seen from FIG. 1A to FIG. 1C that the universal optical fiber connector 10 in this embodiment comprises a main body 100 and an optical fiber connector assembly 110, among which the optical fiber connector assembly 110 further comprises a ceramic ferrule 111, a wedge for the ceramic ferrule 112 and a pre-embedded optical fibers 113, which allows the spring 114 to pass through the outer surface and prevents the pre-embedded optical fiber from breaking by elastic deformation after being connected with the main body 100.

The main body 100 further comprises a tubular nut at the front end of the wedge 101, a nut at the back end of the wedge 102 and a retaining nut 103. The edge on the inner side of the tail end of the nut at the front end of the wedge 101 is connected with the screw threads on the edge of the outer side of the front end of the nut at the back end of the wedge 102, clamping the wedge for the ceramic ferrule 112. The pre-embedded optical fiber 113 is covered by the heat-shrinkable sleeve 121 after being spliced with the to-be-spliced optical fiber 125. The heat-shrinkable sleeve 121 is covered by the protective shell for the heat-shrinkable sleeve 122.

The outer edge of the back end of the nut at the back end of the wedge 102 is connected with the protective shell for the heat-shrinkable sleeve 122 through screw threads. The retaining nut 103 is configured with a prominence 1031 on the inner edge, the nut at the front end of the wedge 101 is configured with a raised first step 1011 in the middle of the outer edge, the nut at the back end of the wedge 102 is configured with a raised second step 1021 on the outer edge, and the prominence 1031 on the inner edge of the retaining nut 103 slides back and forth in a limited area between the first step 1011 and the second step 1021.

The end of the protective shell for the heat-shrinkable sleeve 122 is attached to an optical fiber locking device for the locking of the jointed optical fiber 125. This device is configured independently from the protective shell for the heat-shrinkable sleeve. More particularly, the optical fiber locking device further comprises an optical fiber snap 123 and an optical fiber locking nut 124. The tail end of the protective shell for the heat-shrinkable sleeve can be dismountably connected with the optical fiber snap 123 which has two elastic laminates with a gap between them.

After being connected with the protective shell for the heat-shrinkable sleeve 122, the optical fiber snap 123 couples the optical fiber locking nut 124 externally which is connected with the back end of the protective shell for the heat-shrinkable sleeve 123 by screw threads. According to the drawings, the optical fiber locking nut 124 is trumpet-shaped with one large end and one small end, thus its outer surface can compress the two elastic laminates of the optical fiber snap 123 and lock the to-be-spliced optical fiber during the continuously tightening of the optical fiber locking nut 124 and the protective shell for the heat-shrinkable sleeve 122. In this way, every type of to-be-spliced optical fiber is applicable.

Among which, the optical fiber snap can choose different types and optical fiber snaps of different types have different gap distances between elastic laminates to adapt to optical fibers of different types. The preferred optical fibers of different types have the same-size circular rings and different gap distances between elastic laminates. Such preferred embodiments allow the elastic laminates of optical fiber snaps of different types to adapt to optical fibers of different sizes and control the size of such optical fibers by the included angle of the two laminates.

Figure 1D:
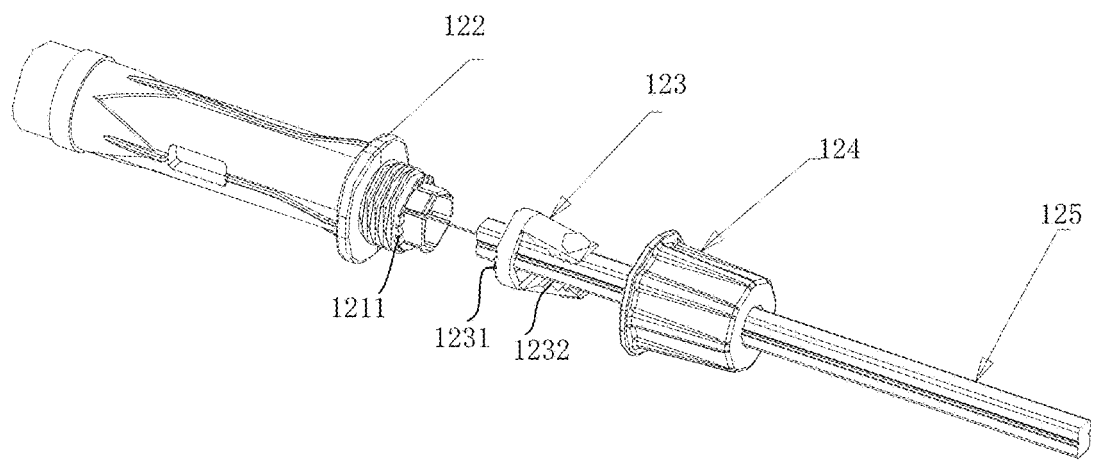
FIG. 1D is a detailed structure drawing of the optical fiber locking device of the universal optical fiber connector provided by the present invention.

Moreover, as shown in FIG. 1D, the tail end of the protective shell for the heat-shrinkable sleeve 122 and that of the optical fiber snap 123 are respectively configured with a dentate part that could be in mesh (1211 and 1231), allowing only unidirectional movements of the optical fiber snap 123 relative to the protective shell for the heat-shrinkable sleeve 122, which is in the opposite direction to the tightening direction of the locking nut 124, after the optical fiber snap 123 is connected with the protective shell for the heat-shrinkable sleeve 122, i.e. the to-be-spliced optical fiber do not rotate with the tightening of the optical fiber locking nut 124.

The inner sides of laminates can also be configured with teeth 1232 to ensure that the two tightened laminates of the optical fiber snap 123 can clamp the sheathed optical cable 125 without sliding and that the sheathed optical cable 125 may not slide with the optical fiber snap 123 after being clamped.

Figure 1E:
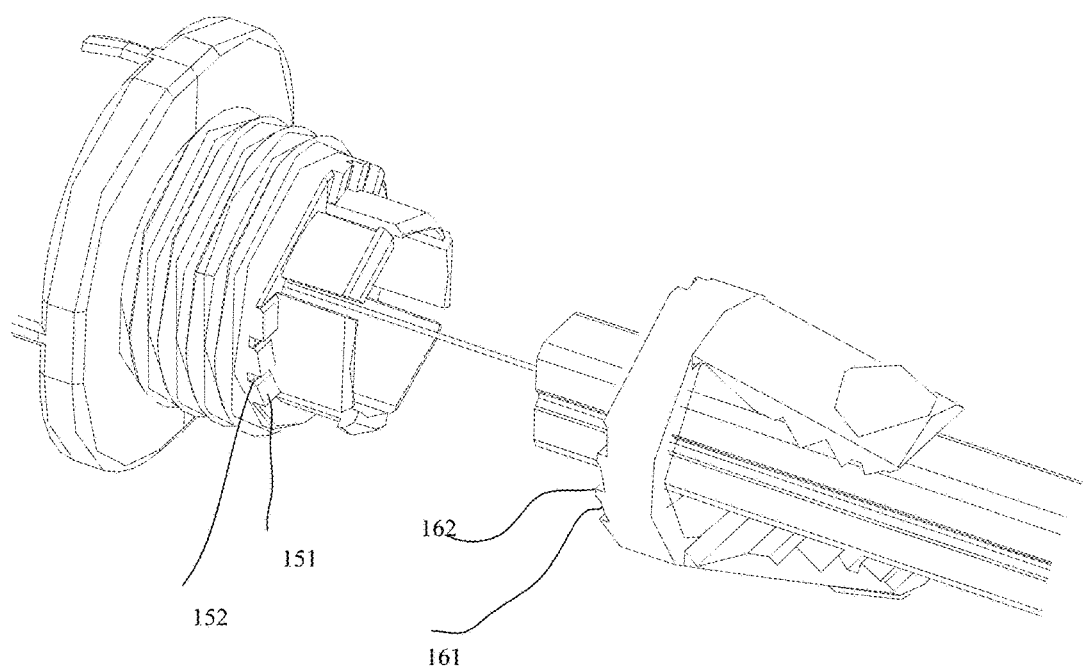
FIG. 1E is a partial enlarged structure drawing of the optical fiber locking device of the universal optical fiber connector provided by the present invention.

According to the further reference to FIG. 1E, the dentate part 1211 at the tail end of the protective shell for the heat-shrinkable sleeve 122 have several first inclined parts and sunk parts 152 connected to the tail end of every first inclined part 151, and the dentate part at the tail end of the optical fiber snap 123 have second inclined parts 161 which correspond to each of the first inclined parts 151, which is for the bonded connection of the optical fiber locking snap and the protective shell for the heat-shrinkable sleeve.

The tail end of each second inclined part 161 is configured with a protruding part 162, and the size of each protruding part 162 corresponds to that of each sunk part 152, which holds the sunk part 152 perfectly, allowing only unidirectional movements of the optical fiber snap 123 relative to the protective shell for the heat-shrinkable sleeve 122 after being connected with the protective shell for the heat-shrinkable sleeve 122.

As FIG. 1E is only one preferred embodiment, the sunken parts and the protruding parts can also be configured conversely. For example, same results can be achieved if configuring the first inclined parts and protruding parts at the dentate part 1211 at the tail end of the protective shell for the heat-shrinkable sleeve 122 and configuring the second inclined parts corresponding to each of the first inclined parts and sunk parts corresponding to the protruding parts at the dentate part 1231 at the tail end of the optical fiber snap 123, which will not be explained further here.

When used, the optical fiber snap 123 is covered at the tail end of the protective shell for the heat-shrinkable sleeve 122 and then the optical fiber snap 123 seizes the sheathed optical cable after the sheathed optical cable heat-melts and heat-shrinks with the pre-embedded optical fiber. The inclined plane inside the optical fiber locking nut 124 drives the two elastic laminates of the optical fiber snap 123 to clamp the optical fiber when tightening the optical fiber locking nut 124 and the screw threads at the tail end of the protective shell for the heat-shrinkable sleeve 122.

The tail end of the optical fiber snap 123 and the protective shell for the heat-shrinkable sleeve 122 are both configured with a dentate part, which are allowed for unidirectional movements only to prevent the optical fiber locking nut 124 from driving the optical fiber snap 123 to rotate during locking, thus preventing the twist of the optical fiber and ensuring the effect of the welding point for connection. The optical fiber snap 123 does not rotate with the optical fiber locking nut 124 when the optical fiber locking nut 124 is locked, preventing the welding point from breaking when both of them rotate.

Besides, the optical fiber snap 123 and the optical fiber locking nut 124 can rotate in opposite directions, which allows the locking of the optical fiber locking nut 124 to prevent the welding point from breaking after slightly adjusting and rotating the optical fiber snap 123 to place the sheathed optical cable 125 and the optical fiber snap 123 at a same horizontal level when the sheathed optical cable 125 and the optical fiber snap 123 are not placed at a same horizontal level.

More particularly, the optical fiber snap 123 can rotate relatively with the protective shell for the heat-shrinkable sleeve 122, ensuring that the corresponding side of rectangle-sectioned optical fiber, such as sheathed optical cables, with the snap is the long side, which avoids the distortion of the heat-shrunk optical fiber caused by the non-correspondence of the snap and the long side of the optical fiber and thus affects its loss.

Figure 2A:
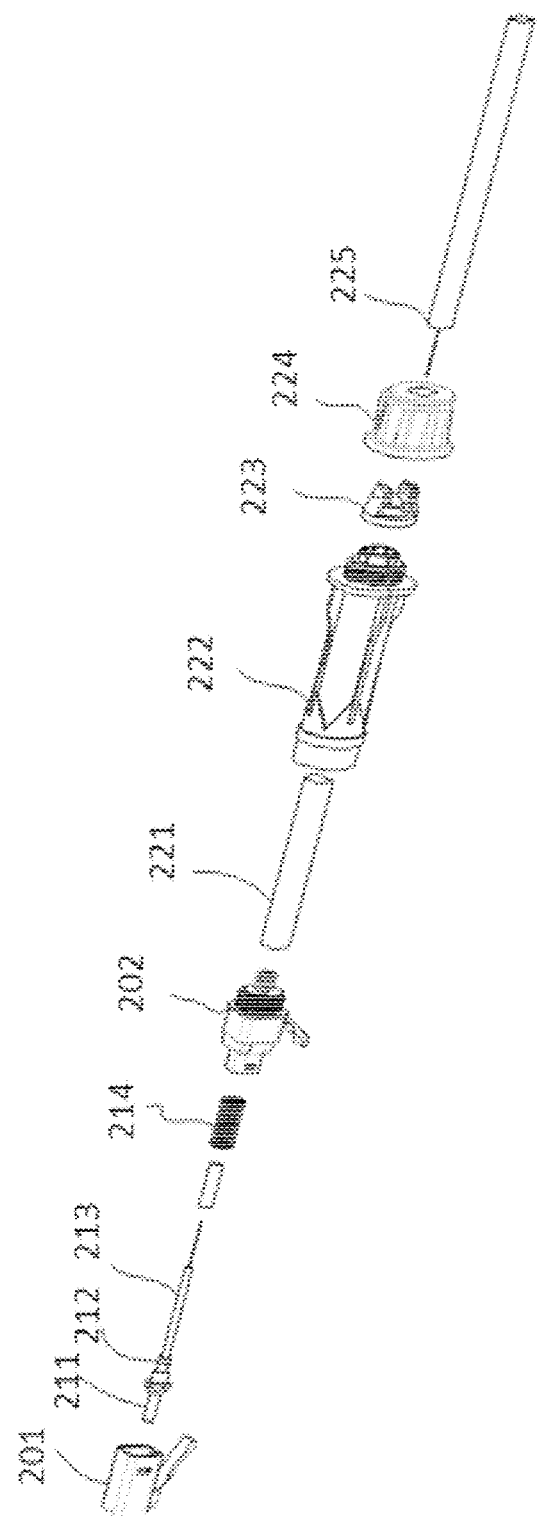
FIG. 2A is an exploded view of the second embodiment of the universal optical fiber connector provided by the present invention.
Figure 2B:
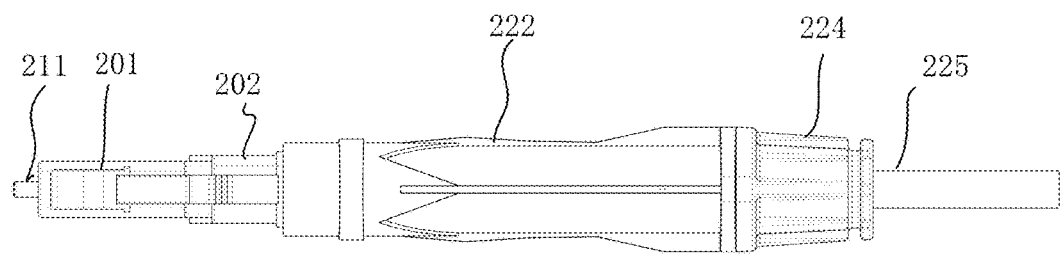
FIG. 2B is a constitutional diagram of the second embodiment of the universal optical fiber connector provided by the present invention.
Figure 2C:
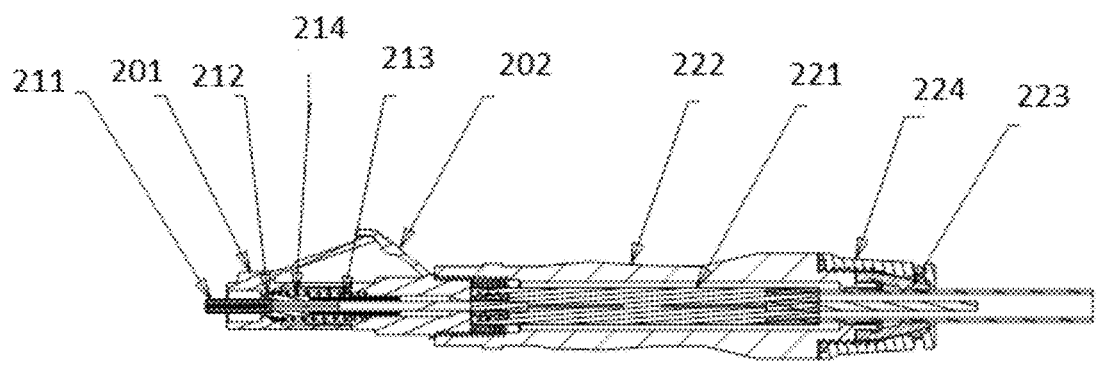
FIG. 2C is a sectional view of the second embodiment of the universal optical fiber connector provided by the present invention.

FIG. 2A is an exploded view of the second embodiment of the universal optical fiber connector provided by the present invention; FIG. 2B is a constitutional diagram of this embodiment; and FIG. 2C is a sectional view of this embodiment. As shown in FIG. 2A to FIG. 2C, the universal optical fiber connector in this embodiment also comprises the main body and the optical fiber connector assembly, among which the optical fiber connector assembly further comprises a ceramic ferrule 211, a wedge for the ceramic ferrule 212 and a pre-embedded optical fibers 213, which allows the spring 214 to pass through the outer surface and prevent the pre-embedded optical fiber 213 from breaking by elastic deformation after being connected to the main body.

As shown in FIG. 2A to FIG. 2C, the main body in this embodiment further comprises a front shell for the wedge 201 and a back shell for the wedge 202. The front shell for the wedge 201 and the back shell for the wedge 202 can be clamped into a whole, clamping the wedge for the ceramic ferrule 212. The back shell for the wedge 202 is configured with screw threads on the outer edge of the tail end. After welding with the to-be-spliced optical fiber 225, the pre-embedded optical fiber 213 is covered by the heat-shrinkable sleeve 221, which is then covered by the protective shell for the heat-shrinkable sleeve 222, whose screw threads are for the connection with the back shell for the wedge 202.

Similar to the first embodiment, the tail end of the protective shell for the heat-shrinkable sleeve 222 is connected with an optical fiber locking device for the locking of the to-be-spliced optical fiber 225. More particularly, the locking device further comprises an optical fiber snap 223 and an optical fiber locking nut 224. The tail end of the protective shell for the heat-shrinkable sleeve can be dismountably connection with the optical fiber snap 223 which includes two laminates with a gap between them.

After being connected with the protective shell for the heat-shrinkable sleeve 222, the optical fiber snap 223 couples an optical fiber locking nut 224 externally, which is connected with the screw threads at the back end of the protective shell for the heat-shrinkable sleeve 223. As shown in the drawings, the optical fiber locking nut 224 is trumpet-shaped with one large end and one small end, thus its outer surface can compress the two elastic laminates of the optical fiber snap 223 and lock the to-be-spliced optical fiber 225 during the continuously tightening of the optical fiber locking nut 224 and the protective shell for the heat-shrinkable sleeve 222. In this way, every type of to-be-spliced optical fiber is applicable.

Figure 3A:
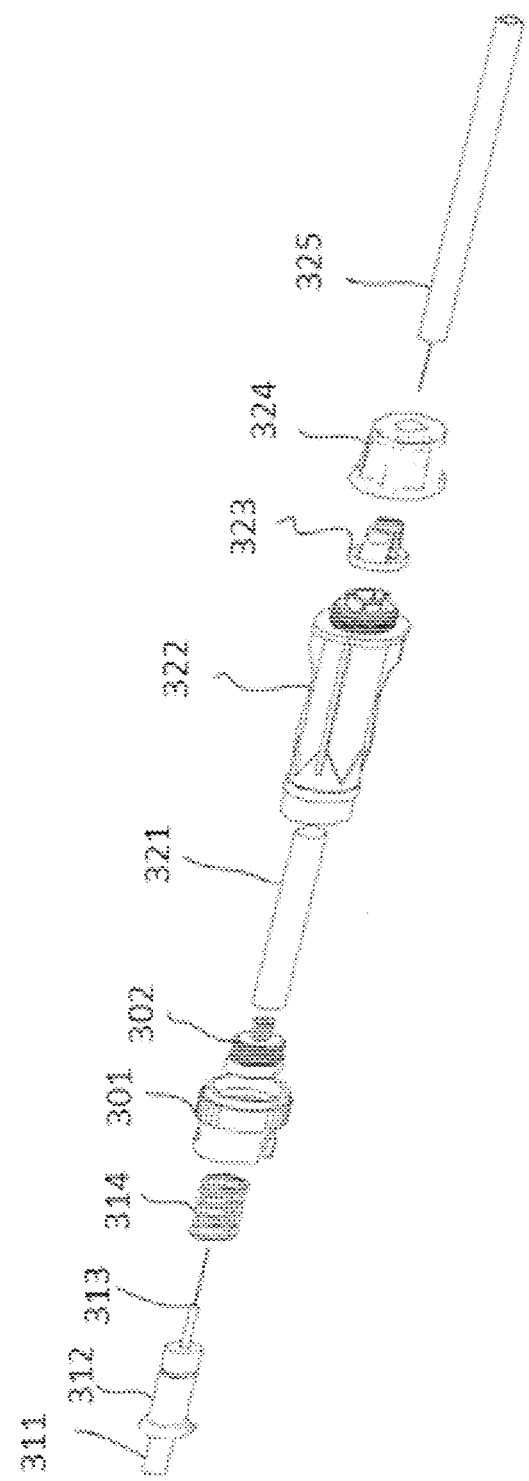
FIG. 3A is an exploded view of the third embodiment of the universal optical fiber connector provided by the present invention.
Figure 3B:
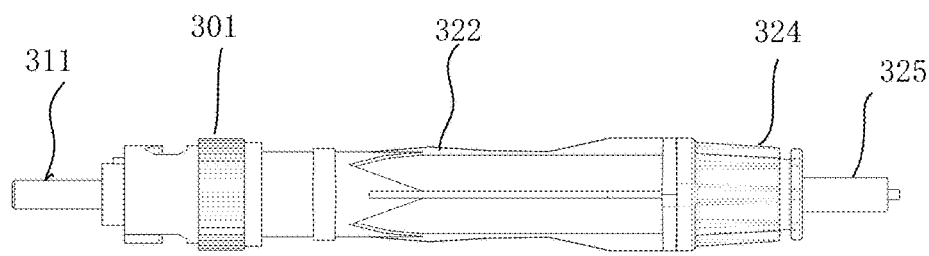
FIG. 3B is a constitutional diagram of the third embodiment of the universal optical fiber connector provided by the present invention.
Figure 3C:
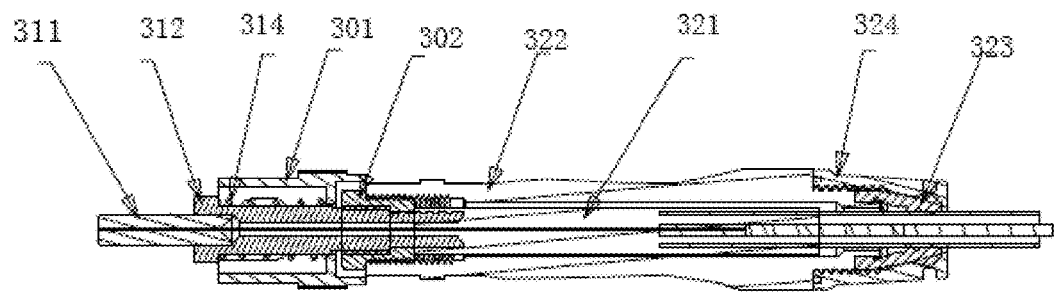
FIG. 3C is a sectional view of the third embodiment of the universal optical fiber connector provided by the present invention.

FIG. 3A is an exploded view of the third embodiment of the universal optical fiber connector provided by the present invention; FIG. 3B is a constitutional diagram of this embodiment; and FIG. 3C is a sectional view of this embodiment. As shown in FIG. 3A to FIG. 3C, the universal optical fiber connector in this embodiment comprises the main body and an optical fiber connector assembly, among which the optical fiber connector assembly further comprises a ceramic ferrule 311, a wedge for the ceramic ferrule 312 and a pre-embedded optical fibers 313, which allows the spring 314 to pass through the outer surface and prevents the pre-embedded optical fibers 313 from breaking by elastic deformation after being connected with the main body.

As shown in FIG. 3A to FIG. 3C, the main body of the retaining nut in this embodiment further comprises a retaining nut for the connector 301 and a retaining nut for the wedge 302. The wedge for the ceramic ferrule 312 is fixed by the retaining nut for the wedge 302 after passing through the middle of the retaining nut for the connector 301. The retaining nut for the wedge 302 is hollow, the pre-embedded optical fiber 313 passes through the middle of the retaining nut for the wedge 302 and then weld with the to-be-spliced optical fiber 325, after that the pre-embedded optical fiber 313 is covered by the heat-shrinkable sleeve 321 on the outer surface and then covered by the protective shell for the heat-shrinkable sleeve 322 after the heat-shrinkable sleeve 321 is fixed. The retaining nut for the wedge 302 is configured with screw threads on the outer edge of the back end, which is for the coupling with the screw threads of the protective shell for the heat-shrinkable sleeve 322.

Similar to the two above-mentioned embodiments, the tail end of the protective shell for the heat-shrinkable sleeve 322 is connected with an optical fiber locking device for the locking of the to-be-spliced optical fiber 325. More particularly, the locking device further comprises an optical fiber snap 323 and an optical fiber locking nut 324.

The tail end of the protective shell for the heat-shrinkable sleeve 322 can be dismountably connected with the optical fiber snap 323 which includes two laminates with a gap between them. After being connected with the protective shell for the heat-shrinkable sleeve 322, the optical fiber snap 323 couples an optical fiber locking nut 324 externally, which is connected with the screw threads at the back end of the protective shell for the heat-shrinkable sleeve 322.

As shown in the drawings, the optical fiber locking nut 324 is trumpet-shaped with one large end and one small end, thus its outer surface can compress the two elastic laminates of the optical fiber snap 323 and lock the to-be-spliced optical fiber during the continuously tightening of the optical fiber locking nut 324 and the protective shell for the heat-shrinkable sleeve 322. In this way, every type of to-be-spliced optical fiber is applicable.

The above-mentioned embodiments are just a few groups of common optical fiber connectors. As for other types of optical fiber connectors, the protective shell for the heat-shrinkable sleeve can be re-utilized just by configuring connecting screw threads whose sizes correspond to those of the screw threads of the protective shell for the heat-shrinkable sleeve in the hot-melt end connector assembly and also by configuring a similar optical fiber locking device at the tail end, which will not be explained further here.

On the one hand, the universal optical fiber connector provided by the present invention is configured with a locking device containing an optical fiber snap and can be independent from the protective shell for the heat-shrinkable sleeve, thus it can choose and use different optical fiber snaps cooperatively in accordance with different optical fibers; in regards to some special optical fibers, the snap may not be adopted and the protection can be realized by tightening the locking nut and the protective shell for the heat-shrinkable sleeve, consequently allowing the connector to be compatible to a variety of optical fibers.

On the other hand, the main body is configured with universal screw threads according to the size of the protective shell for the heat-shrinkable sleeve and the screw threads configured on the protective shell for the heat-shrinkable sleeve, realizing the dismountable connection between different types of main bodies of the hot-melt end and one end of the same type of the protective shell for the heat-shrinkable sleeve through screw threads, and strengthening the tensile strength of the optical fiber connector, thus the protective shell for the heat-shrinkable sleeves of optical fiber connectors of different types can be replaced by those optical fiber connectors of other types when they are damaged, so as to improve the resource utilization efficiency and avoid wasting. Moreover, the protective shell for the heat-shrinkable sleeve can be volume-produced with the same mould instead of being produced independently for each type, thus improving the production efficiency.

Finally, it should be noted that the above-mentioned embodiments are just technical solutions for the description of the present invention rather than limits. While the preferred embodiments have been chosen to illustrate the present invention in detail, the ordinary skilled person in the art should understand that modifications and substitutions can be made to the technical solutions of the present invention without departing from the ideas and scope of the technical solutions of the present invention.

The invention claimed is:

1. A universal optical fiber connector, comprising:
a main body;
an optical fiber connector assembly penetrating through the main body, wherein the optical fiber connector assembly includes a ceramic ferrule, and a wedge for the ceramic ferrule, the ceramic ferrule and the wedge for the ceramic ferrule have a via hole for placing a pre-embedded optical fiber passing through the main body;
a heat-shrinkable sleeve connected to the main body for covering a joint of the pre-embedded optical fiber and a to-be-spliced optical fiber; and
a protective shell for the heat-shrinkable sleeve for covering the heat-shrinkable sleeve;
an optical fiber locking device for locking the to-be-spliced optical fiber, the optical locking device is connected to a back end of the protective shell for the heat-shrinkable sleeve, wherein the optical fiber locking device comprises a dismountable optical fiber clamp and an optical fiber locking nut, the optical fiber locking nut couples with a first screw thread on the back end of the protective shell for the heat-shrinkable sleeve;
wherein the optical fiber locking device and the protective shell for the heat-shrinkable sleeve are two parts that are able to be separated.

2. The optical fiber connector according to claim 1, wherein:
a tail of the protective shell for the heat-shrinkable sleeve is dismountably connected with the optical fiber clamp;
the optical fiber clamp includes two elastic laminates with a gap between them; and
after coupling the optical fiber clamp and the protective shell for the heat-shrinkable sleeve, and after coupling the optical fiber locking nut and the protective shell for the heat-shrinkable sleeve, the two elastic laminates are compressed by the optical fiber locking nut.

3. The optical fiber connector according to claim 2, wherein:
the tail of the protective shell for the heat-shrinkable sleeve has a first dentate part;
a tail of the optical fiber clamp has a second dentate part that is able to be meshed with the first dentate part; and,
when the first dentate part is meshed with the second dentate part, the optical fiber clamp is limited to unidirectionally rotate relative to the protective shell for the heat-shrinkable sleeve, such that the optical fiber clamp does not rotate with a tightening of the optical fiber locking nut after being connected with the protective shell for the heat-shrinkable sleeve.

4. The optical fiber connector according to claim 2, wherein inner sides of the two elastic laminates of the optical fiber clamp have teeth.

5. The optical fiber connector according to claim 3, wherein:
the main body is dismountably coupled with a front end of the protective shell for the heat-shrinkable sleeve through a second screw thread.

6. The optical fiber connector according to claim 5, wherein the protective shell for the heat-shrinkable sleeve is tubular, with the second screw thread on an inner edge of the front end.

7. The optical fiber connector according to claim 6, wherein:
the main body comprises a tubular nut at a front end of the wedge, a nut at a front end of the wedge, and a retaining nut, wherein:

an inner edge at a tail of the tubular nut at the front end of the wedge is connected with a third screw thread on an outer edge of the nut at the front end of the wedge to clamp the wedge for the ceramic ferrule;

an outer edge at a tail end of the nut at the back end of the wedge is connected with the second screw thread of the protective shell for the heat-shrinkable sleeve;

a protrusion is configured on an inner edge of the retaining nut;

a first step is configured in a middle portion of an outer edge of the nut at the front end of the wedge;

a second step is configured on an outer edge of the nut at the back end of the wedge; and the protrusion configured on the inner edge of the retaining nut is able to slide back and forth in a limited area between the first step and the second step.

8. The optical fiber connector according to claim 6, wherein:

the main body comprises a front shell for the wedge, and a back shell for the wedge;

the front shell for the wedge and the back shell for the wedge are able to be clamped together to clamp the wedge for the ceramic ferrule; and the back shell for the wedge is configured with a third screw thread on an outer edge of a tail end of the back shell for the wedge, the third screw thread of the back shell for the wedge are used for coupling with the second screw thread of the protective shell for the heat-shrinkable sleeve.

9. The optical fiber connector according to claim 6, wherein:

the main body comprises a retaining nut for the wedge;

the wedge for the ceramic ferrule is fixed by the retaining nut for the wedge when the wedge for the ceramic ferrule penetrates through the retaining nut for the connector; and the retaining nut for the wedge is configured with a third screw thread on an outer edge of a back end of the retaining nut for the wedge, the third screw thread of the retaining nut for the wedge are used for coupling with the second screw thread of the protective shell for the heat-shrinkable sleeve.

* * * * *